United States Patent [19]

Metz

[11] Patent Number: 4,482,107
[45] Date of Patent: Nov. 13, 1984

[54] CONTROL DEVICE USING GAS JETS FOR A GUIDED MISSILE

[75] Inventor: Pierre Metz, Paris, France
[73] Assignee: Thomson-Brandt, Paris, France
[21] Appl. No.: 392,614
[22] Filed: Jun. 28, 1982

[30] Foreign Application Priority Data

Jun. 30, 1981 [FR] France ............................... 81 12835

[51] Int. Cl.³ ............................................. F42B 15/18
[52] U.S. Cl. ................................ 244/3.22; 239/265.19
[58] Field of Search ....................... 89/1.703; 102/381; 239/265.19, 265.25, 436, 443, 444; 60/230, 271; 244/3.22, 52

[56] References Cited

U.S. PATENT DOCUMENTS

| | | | |
|---|---|---|---|
| 3,110,228 | 12/1963 | Shramo et al. | |
| 3,190,584 | 6/1965 | Gire et al. | 239/265.25 |
| 3,273,825 | 9/1966 | Kerner | 244/3.22 |
| 3,302,890 | 2/1967 | Silver | 239/265.31 |
| 3,304,721 | 2/1967 | Oppel | |
| 4,265,405 | 5/1981 | Takagi | 239/444 |
| 4,384,690 | 5/1983 | Brodersen | 244/3.22 |

FOREIGN PATENT DOCUMENTS

| | | |
|---|---|---|
| 49985 | 8/1970 | Australia. |
| 1293654 | 4/1962 | France. |
| 82162 | 11/1963 | France. |
| 865785 | 4/1961 | United Kingdom. |

*Primary Examiner*—Richard E. Schafer
*Assistant Examiner*—Maureen T. Ryan
*Attorney, Agent, or Firm*—Oblon, Fisher, Spivak, McClelland & Maier

[57] ABSTRACT

A control device using gas jets makes it possible to modify the flight direction of a guided missile. This device comprises an energy source supplying a gas flow to a set of fixed nozzles arranged in an annular member within which are coaxially placed movable sleeves, respectively provided with gas passage openings or ports. Means are provided for positioning these openings so as face the inlets of the nozzles, in order to divert the gas flow towards one of the nozzles.

8 Claims, 14 Drawing Figures

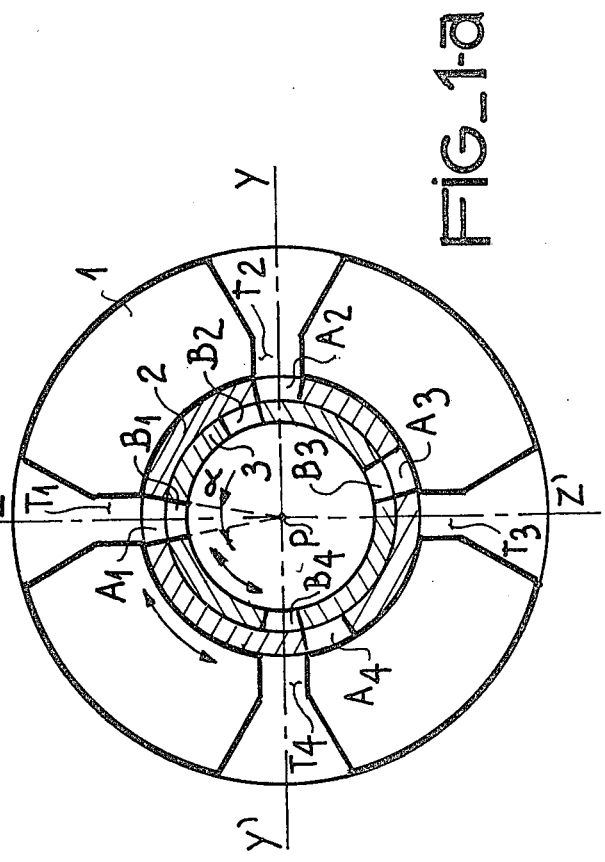
Fig_1-a
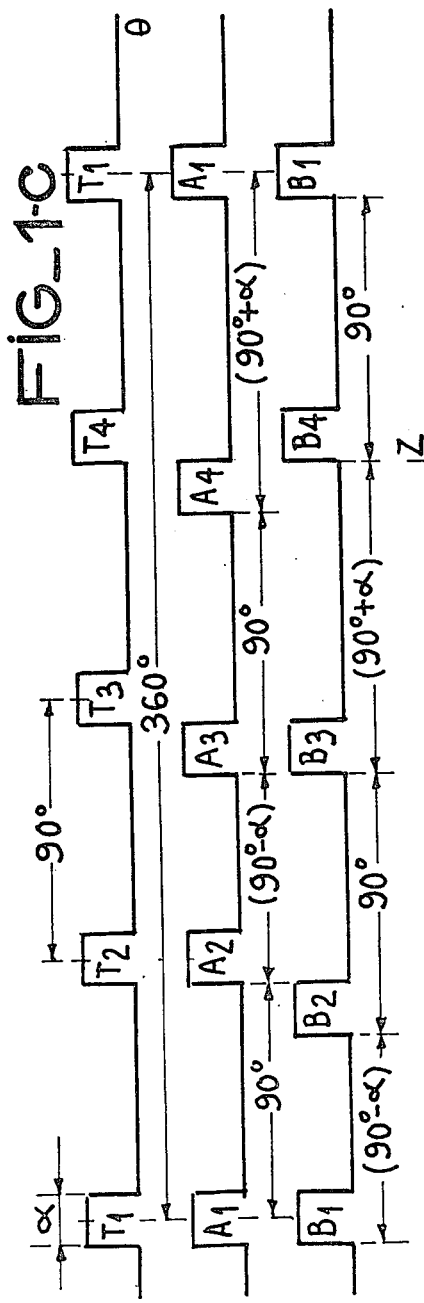
Fig_1-c
Fig_1-b

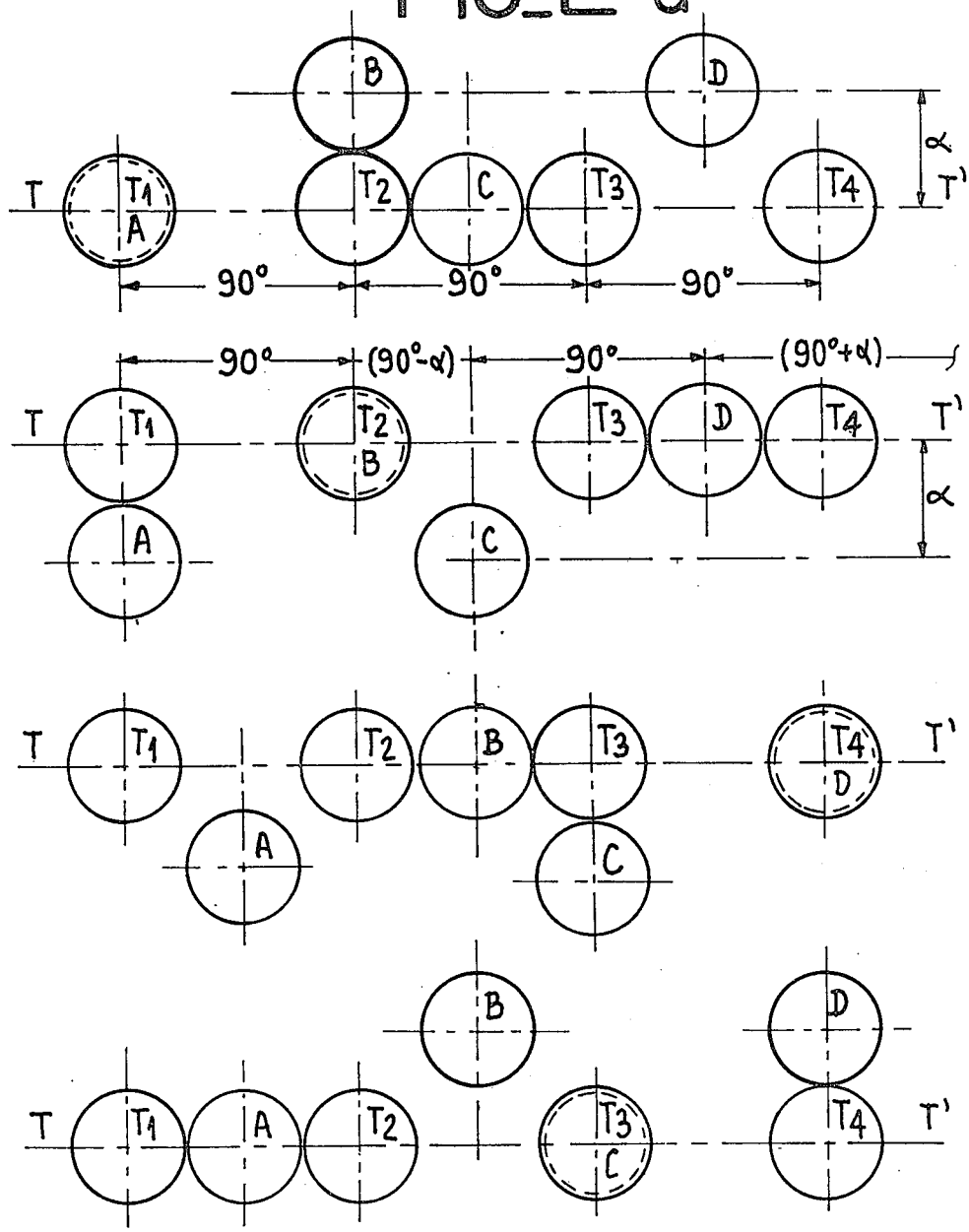
FIG_2-a
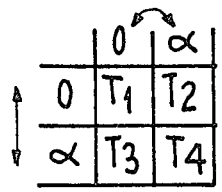
FIG_2-b

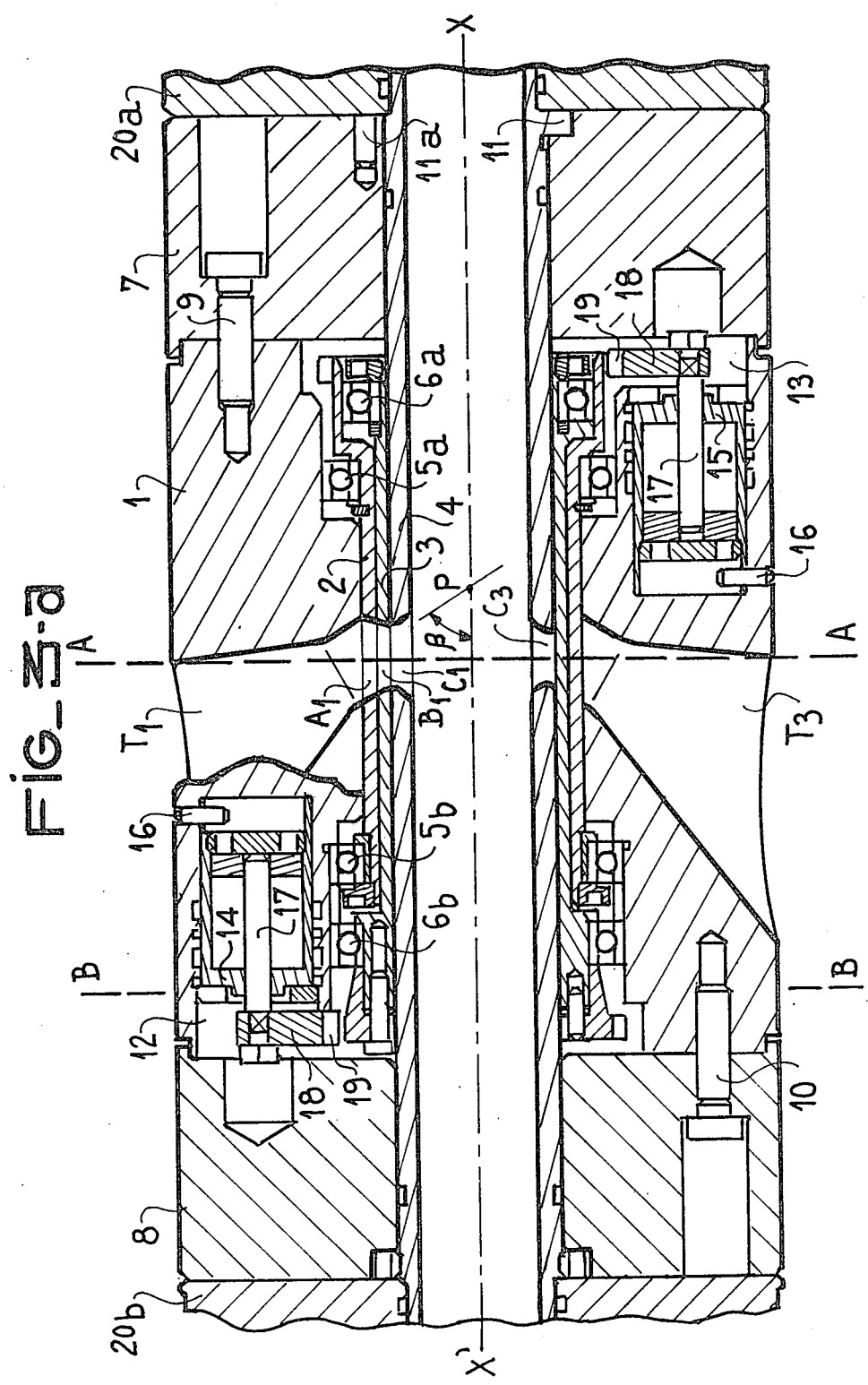

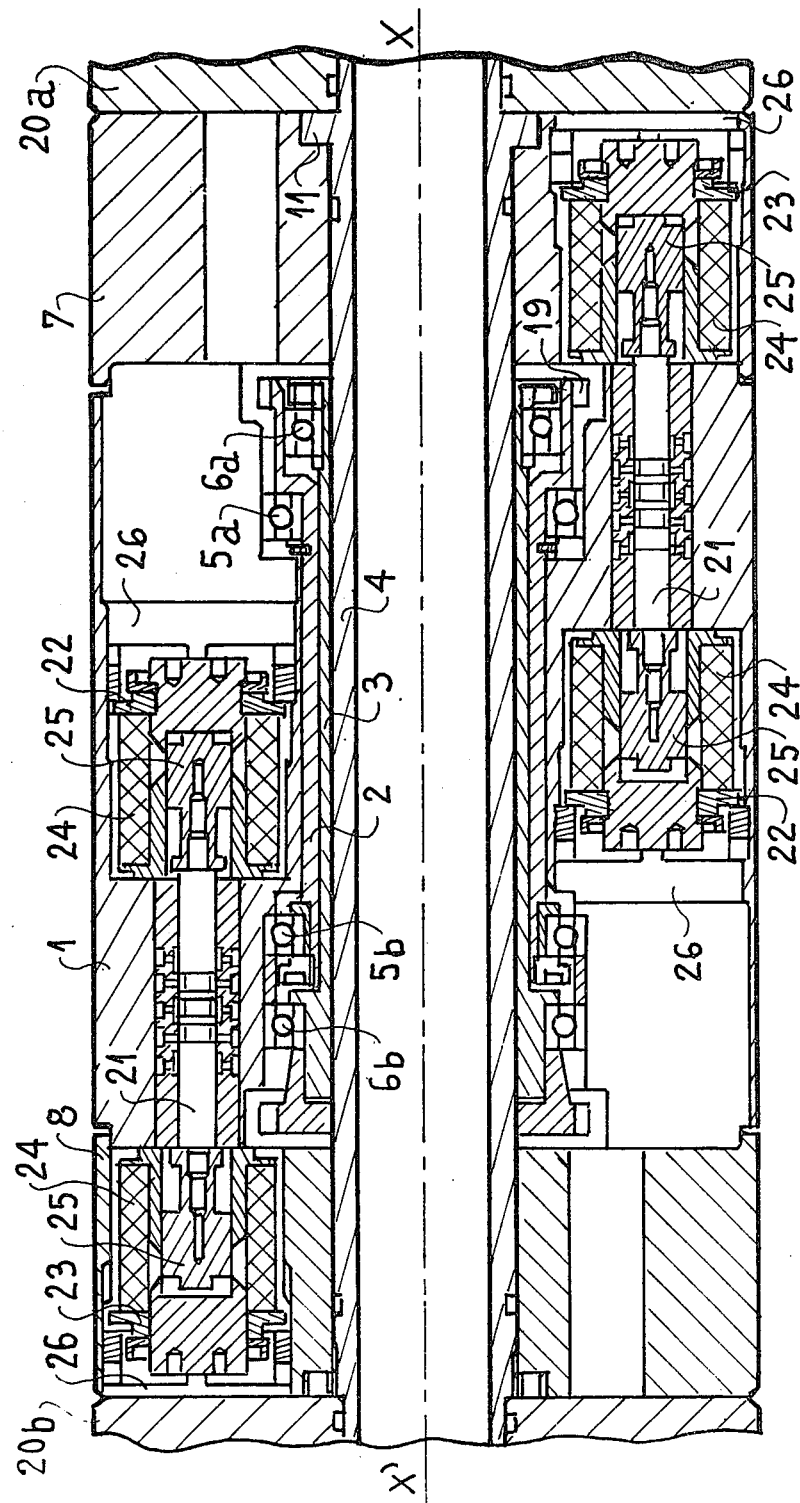

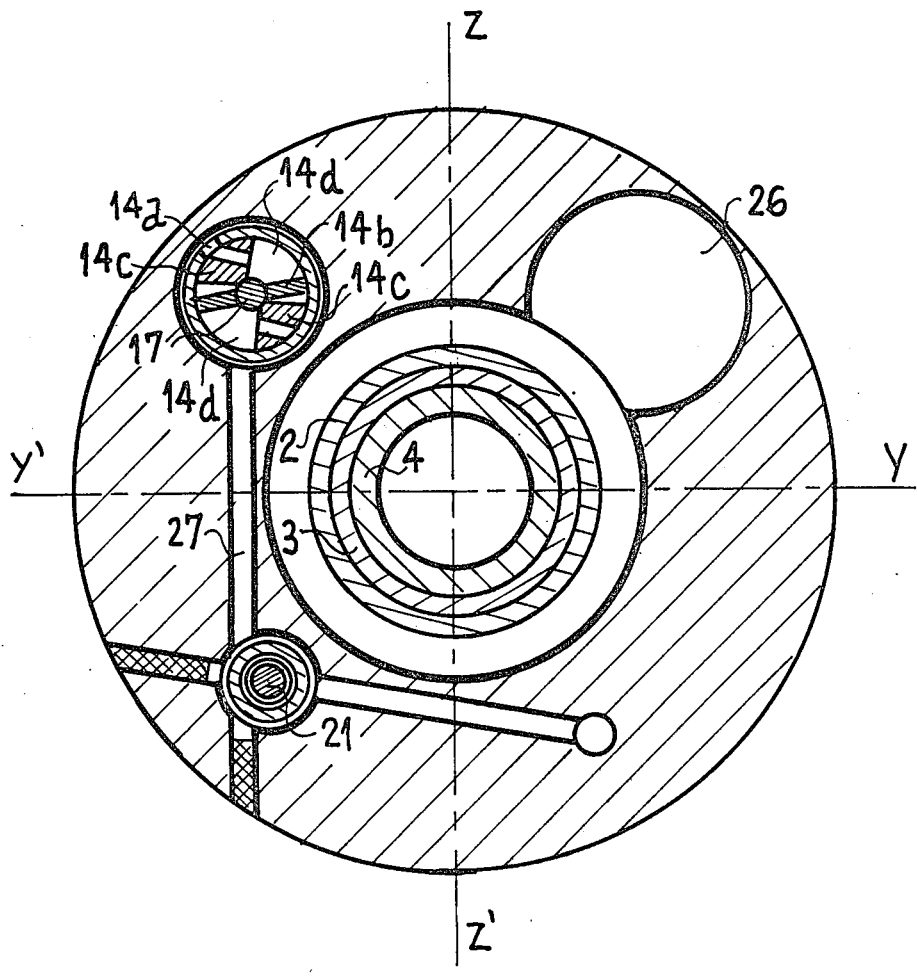
FIG_3-C

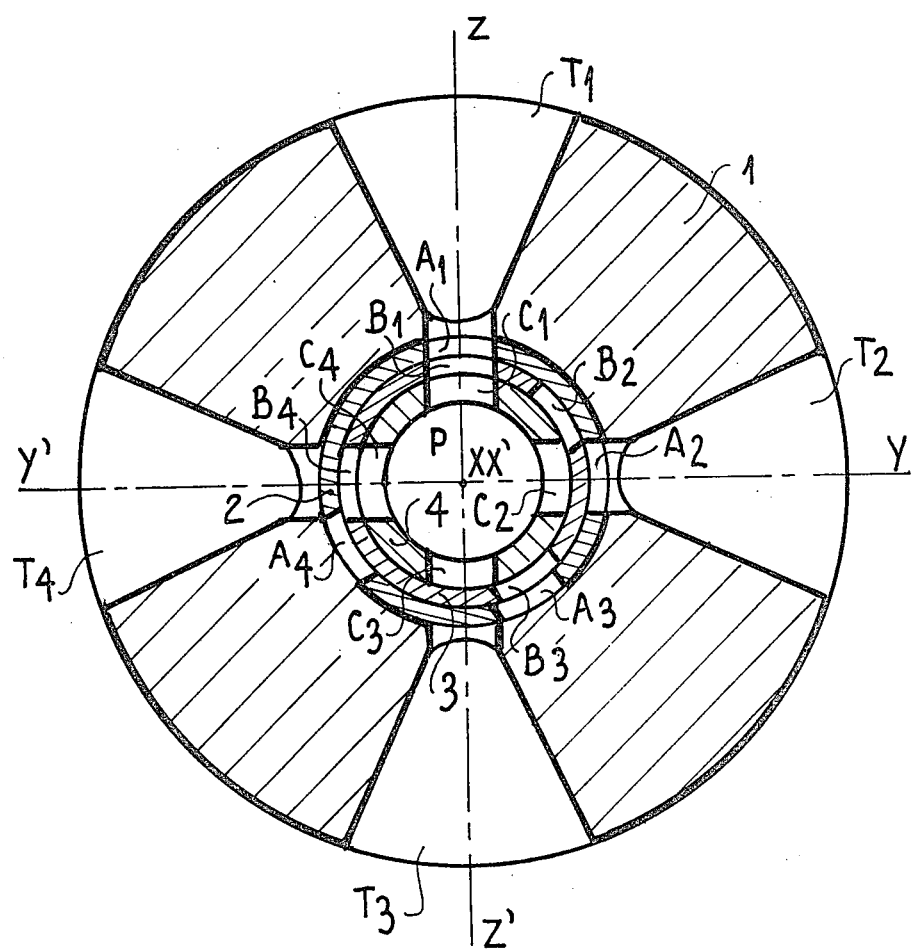
FIG_3-d

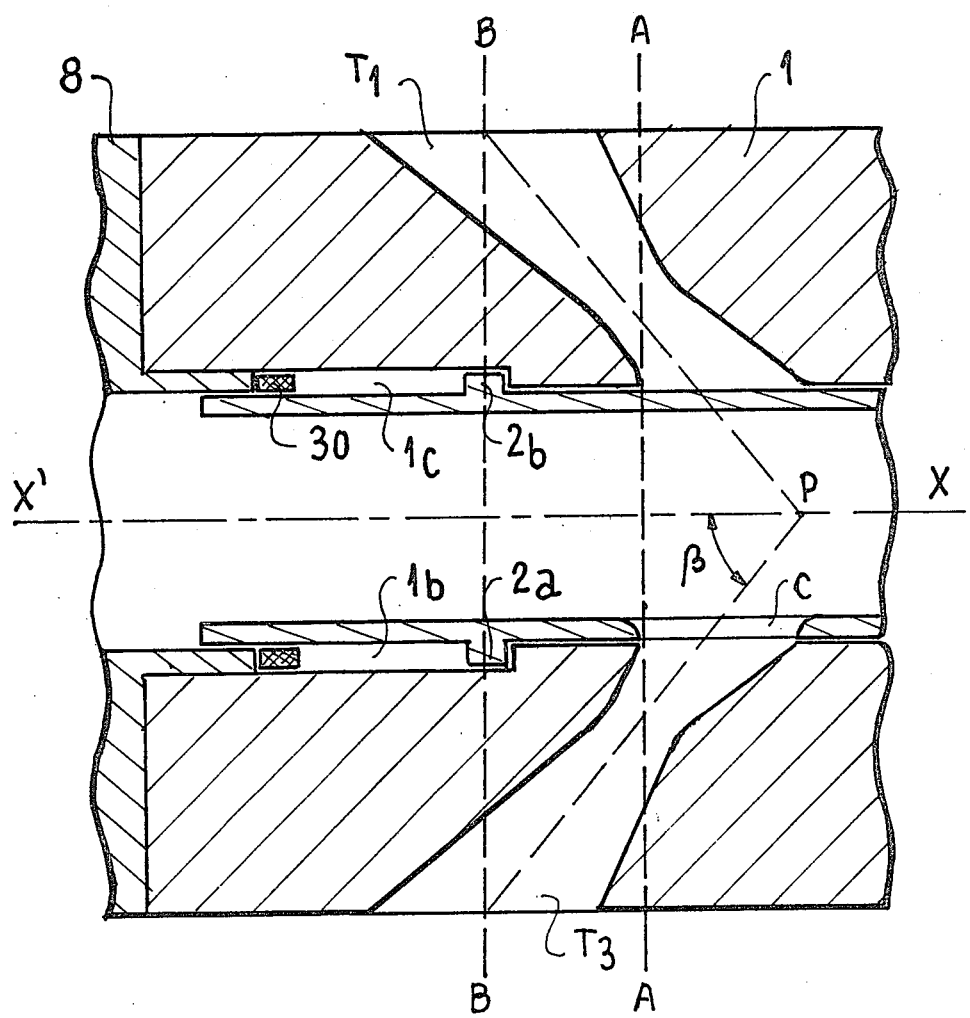

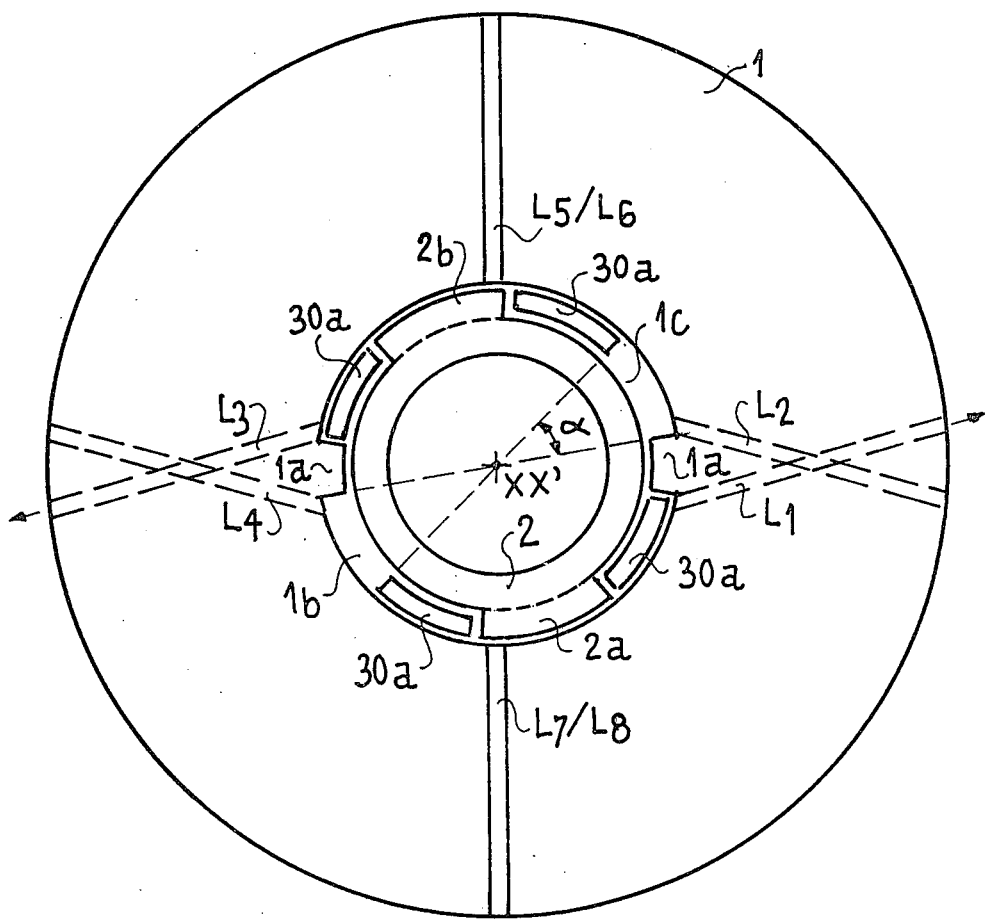
Fig_4-b

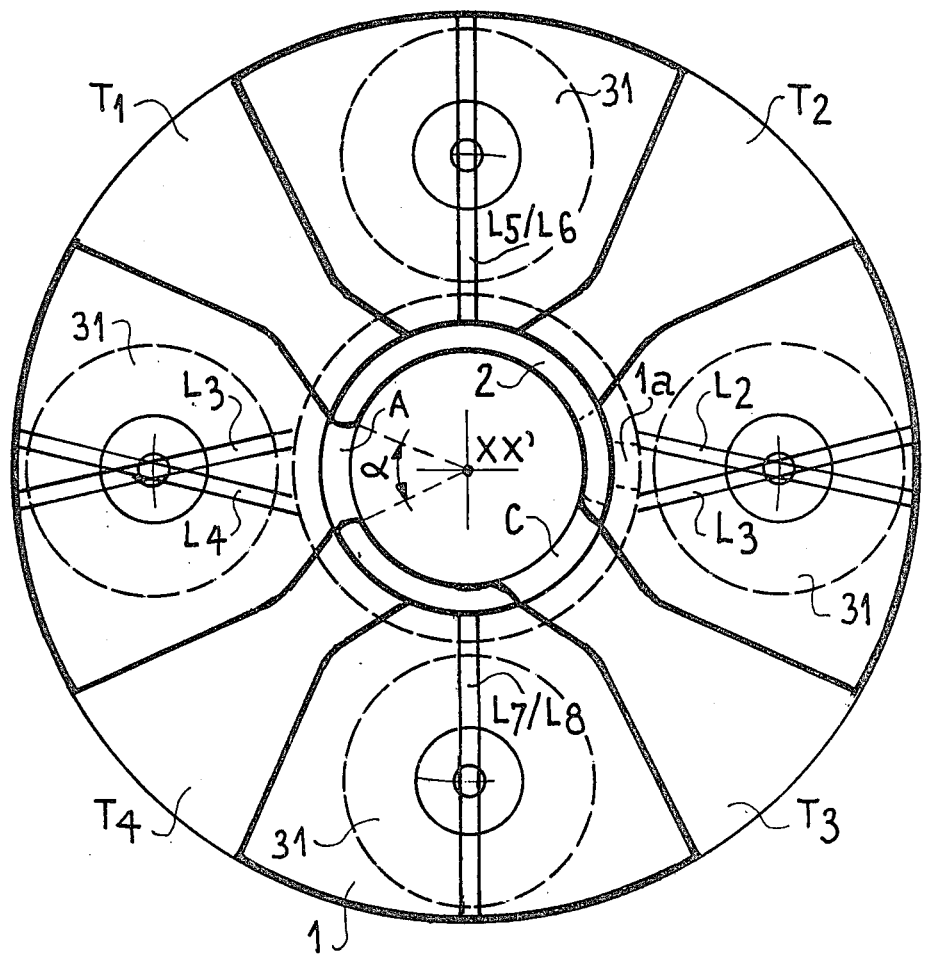
FIG_4-c

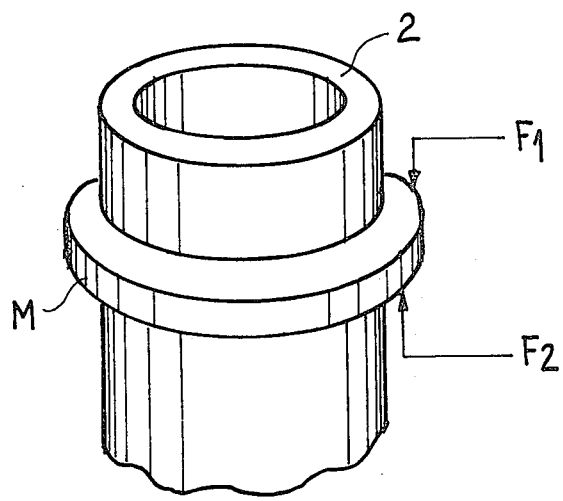
FIG_5-a
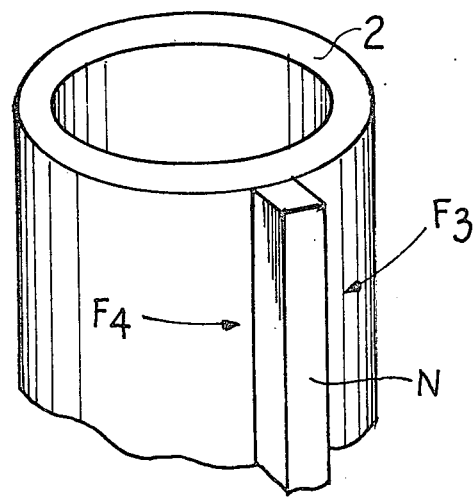
FIG_5-b

CONTROL DEVICE USING GAS JETS FOR A GUIDED MISSILE

BACKGROUND OF THE INVENTION

1. Field of the Invention

The invention relates to the field of guided missiles and more specifically relates to a control device using gas jets making it possible to modify the flight path or trajectory of a missile.

2. Description of the Prior Art

A guided missile more paticularly comprises propulsion means operating over all or part of the flight path of the missile, guidance means for measuring errors in the trajectory of the missile compared with the position of a designated target and control means enabling the correction of these errors in order to minimize the distance by which the missile passes to the side of the target.

The correction in the errors of the trajectory of a guided missile, rocket or the like can be brought about by applying, at a predetermined point of said missile, a lateral thrust force, i.e. a thrust force perpendicular to the longitudinal axis of the missile body. This thrust force can be supplied by the discharge of a flow of material whose orientation and optionally intensity can be modified. This flow of material is generally a gas flow.

A control device using gas jets, more specifically intended for modifying the flight direction of a missile comprises a primary energy source which generates a gas flow, a set of fixed nozzles appropriately distributed over the missile body and means making it possible to divert this gas flow towards one of these nozzles in accordance with control instructions available on board the missile and resulting from measured trajectory errors. In certain applications of guided missiles it is necessary during the flight phase to jointly have an axial thrust force with a view to maintaining the speed of travel of the missile, and a transverse thrust force in order to modify the flight direction of the missile. This can be obtained by inclining the discharge nozzles towards the rear of the missile and consequently increasing the gas flow rate.

Control devices using gas jets can utilize a primary energy source, such as a liquid propellant, which supplies a combustion chamber for providing a gas flow. The use of a liquid propellant ensures great operating flexibility, but makes the construction more complex and reduces the possible storage time. Thus, in most uses for guided missiles, preference is given to control devices employing a solid propellant.

A difficulty which is inherent in solid propellants is that once combustion has been started, the latter must be maintained at a relatively constant gas flow rate. Thus, an increase in the flow rate would lead to flame-out and conversely a reduction in the flow rate would lead to a prohibitive increase in the combustion pressure and therefore to the explosion of the combustion chamber. It is therefore vital for a control device using a solid propellant to operate with a continuous gas flow rate, which only varies within limits compatible with the propellant used.

A problem which arises in connection with the design of a control device using gas jets is to ensure that the direction of the thrust forces passes through the same point advantageously located in the vicinity of the center of gravity of the missile and that the displacement of this center of gravity during the operation of the device only varies to a very limited extent. This center of gravity displacement phenomenon, resulting from the combustion of the propellant becomes more sensible as the propellant mass or weight increases.

French Pat. No. 77 10755, filed on Apr. 8, 1977 by the Applicant Company, discloses a control device using gas jets operating with a continuous, constant gas flow rate. According to an embodiment described therein, the control device comprises two gas generators operating in parallel and a set of four lateral fixed nozzles arranged in ring form on the missile body. These nozzles are connected by gas conduits to a common inlet in which is positioned a vane with four branches articulated on a ball joint. The controlled movements of this vane makes it possible to divert the gas flow into two adjacent nozzles, which are simultaneously open.

BRIEF SUMMARY OF THE INVENTION

The present invention aims at supplying a control device using lateral gas jets, in which the means permitting the diverting of the gas flow are of the isostatic type, i.e. of the type where the pressure forces induced on the diverting means are orthogonal to the control forces of said means and in which, at a given time, only a single nozzle is open.

The object of the invention is a control device using gas jets for a guided missile. This device comprises an annular nozzle holder member within which is coaxially arranged a movable sleeve provided with a gas passage port, the interior of said sleeve being physically coupled to a gas source and said sleeve comprising positioning means making it possible to position the openings facing the inlets of the nozzles in accordance with control instructions.

Another object of the invention is a control device comprising two gas generators positioned on either side of the movable sleeve.

Another object of the invention is a control device in which the effective passage cross-section of the gas flow remains substantially constant during the switching periods of said flow.

Another object of the invention is a control device in which the means making it possible to divert the gas flow in random manner direct said flow towards one of the nozzles.

BRIEF DESCRIPTION OF THE DRAWINGS

The invention is described in greater detail hereinafter relative to non-limitative embodiments and with reference to the attached drawings, wherein show:

FIG. 1a in diagrammatic form the essential components constituting the control device according to the invention.

FIG. 1b the switching matrix of the nozzles of the control device of FIG. 1a.

FIG. 1c in graph form, the relative arrangement of the inlets of the nozzles and the openings of the movable sleeves.

FIG. 2a in diagrammatic form, the relative positions of the inlets of the nozzles and the openings of a control device having a single movable sleeve.

FIG. 2b the switching matrix of the nozzles of the device of FIG. 2a.

FIG. 3a in longitudinal sectional view, an embodiment of a control device according to the invention with two movable sleeves.

FIG. 3b in a longitudinal sectional view, the constructional details of control solenoid valves of a control device having two movable sleeves.

FIG. 3c a cross-sectional view illustrating the constructional details of a rotary positioning actuator for the movable sleeves.

FIG. 3d a cross-section of the relative arrangement of the movable sleeves for a predetermined orientation of the discharged gas flow.

FIG. 4a in a simplified partial view in longitudinal section, an embodiment of a control device according to the invention with a single movable sleeve.

FIG. 4b in a cross-sectional view B—B, the constructional details of the pneumatic positioning means for the movable sleeve.

FIG. 4c a cross-sectional view A—A of the relative positioning of the movable sleeve openings and the inlets of the nozzles.

FIG. 5a in a perspective view, a pneumatic means permitting the translation of the movable sleeve.

FIG. 5b a perspective view of pneumatic means permitting the rotation of the movable sleeve.

DETAILED DESCRIPTION OF THE PREFERRED EMBODIMENTS

The gas generators, which do not form part of the invention, and are well known to those skilled in the construction of missiles and rockets will not be described here.

FIG. 1a illustrates the inventive concept used in the control device to be described hereinafter. In diagrammatic form, it shows a partial view in cross-section of the essential components constituting the control device according to the invention. This device comprises an annular member 1 of longitudinal axis X, X' comprising, in exemplified manner, four identical lateral nozzles $T_1$ to $T_4$ arranged in the same plane perpendicular to the longitudinal axis X, X'. These nozzles are oriented in accordance with two control planes respectively Y, Y' and Z, Z' to which correspond a first pair of nozzles $T_1$, $T_3$ and a second pair of nozzles $T_2$, $T_4$. The direction of the thrust forces supplied by each of these nozzles coincides at a point P located on the longitudinal axis X, X' perpendicular to the guidance planes. It also comprises first and second coaxial movable sleeves 2, 3, located within the annular nozzle holder member 1. Each of these two sleeves is provided with four identical gas passage ports. Openings $A_1$ to $A_4$ correspond to the first sleeve 2 and openings $B_1$ to $B_4$ correspond to the second sleeve 3. The inner part of the second sleeve or inner sleeve is linked with at least one gas generator. The pairs of openings $A_1$-$B_1$, $A_2$-$B_2$, $A_3$-$B_3$ and $A_4$-$B_4$ are always respectively associated with the corresponding nozzles $T_1$ to $T_4$.

The two movable sleeves are free to rotate relative to one another about the longitudinal axis X, X' by an angle corresponding to the arc $\alpha$ of the nozzle inlets and sleeve positioning means are provided for this purpose. The centers of the openings are located in a plane passing through the centers of the nozzle inlets. For each of these sleeves, the relative angular spacing of two of the four openings is equal to 90° and the relative spacing of the two other openings is respectively equal to (90°−$\alpha$) and (90°+$\alpha$).

FIG. 1b shows the switching matrix of the four nozzles $T_1$ to $T_4$, as a function of the rotation of the corresponding openings $A(A_1$ to $A_4)$ and $B(B_1$ to $B_4)$. This switching matrix is not unique and depends on the relative positions of the openings, said matrix defining the switching sequence of the nozzles.

FIG. 1c shows in graph form the relative positioning of the nozzles and the openings of the two movable sleeves in the configuration of FIG. 1a.

It should be noted that the movable sleeves constitute an isostatic or balanced system, because the pressure forces induced by the traversing gas flow are always orthogonal to the positioning forces of the two sleeves. Different positioning variants of these two movable sleeves are possible. According to a first variant the movable sleeves can be translated with respect to one another parallel to the longitudinal axis X, X' of the control device and according to a second variant one of the sleeves can be positioned by a translation movement parallel to axis X, X' and the other by a rotary movement about axis X, X', provided that the two sets of openings ($A_1$ to $A_4$ and ($B_1$ to $B_4$), are correctly positioned.

By reciprocity one of the pairs of nozzles can be longitudinally displaced with respect to the other pair of nozzles, provided that the position of the openings is adapted as a function thereof.

It is possible to see in FIG. 1a that a similar result can be obtained on eliminating the second sleeve 3 and only retaining the first sleeve 2. This single sleeve must then be able to freely perform a rotary movement about longitudinal axis X, X' on the one hand and perform a translation movement parallel to said axis X, X' on the other. The single sleeve must then be provided with corresponding positioning means and correctly positioned openings.

FIG. 2a shows in diagrammatic form and in a developed view, the respective positions of the inlets of nozzles $T_1$ and $T_4$ and the openings (A to D) made in a single sleeve which can be displaced by rotation along the imaginary line T, T' of the nozzles and by translation in a direction orthogonal to said line. As the four nozzles $T_1$ to $T_4$ are positioned in the same plane, the two pairs of openings respectively A, C and B, D are longitudinally displaced from one another, said pairs always being associated with the corresponding pairs of nozzles $T_1$, $T_3$ and $T_2$, $T_4$.

FIG. 2b shows the switching matrix of the nozzles as a function of the rotary movement (double curved arrow) and translation movement (double rectilinear arrow). As stated hereinbefore, the switching matrix is not unique and depends on the relative positioning of the sleeve openings. It makes it possible to define the different possible switching sequences of the gas flow in one of the four nozzles.

By reciprocity a pair of nozzles can be displaced with respect to the other pair of nozzles, provided that the relative positioning of the corresponding openings is adapted on the basis thereof.

On applying the said control device to a guided missile requiring a propulsive force during its flight trajectory, the lateral nozzles can be inclined to jointly supply an axial thrust force making it possible to maintain the speed of the missile and a transverse force for modifying the flight direction thereof. The section of the inlets of the nozzles can be circular, elliptical, rectangular and in general have any shape making it possible to keep constant the effective passage cross-section of the traversing gas flow as a function of the position of the movable sleeve or sleeves. The means for positioning the sleeve or sleeves can advantageously be of the pneumatic type and the energy necessary for the operation can be taken from the gas flow supplied by the gas generator.

FIGS. 3a to 3d show an embodiment of a control device comprising two movable sleeves in the manner described hereinbefore. In a longitudinal sectional view FIG. 3 shows:

an annular nozzle holder member 1 of longitudinal axis X, X';

the annular nozzle holder member comprises a set of four nozzles associated in pairs, FIG. 3a showing only a first pair of diametrically opposite nozzles $T_1$, $T_3$, whereby the inlets of these nozzles are located in the same plane and the orientation of the nozzles being inclined by an angle $\beta$, to the longitudinal axis X,X', the direction of the thrust forces of said nozzles passing through a same point P, whereby the nozzles can optionally be provided with per se known ejectable sealing covers;

a first movable sleeve 2, including four gas passage ports or openings such as $A_1$, and a second movable sleeve 3 including four gas passage ports or openings such as $B_1$;

a fixed sleeve 4 including four gas passage ports or openings such as $C_1$ and $C_3$, the four openings $C_1$ to $C_4$ being angularly equidistant and facing the inlets of the nozzles;

means making it possible to angularly position the two movable sleeves 2, 3 and which will be described hereinafter.

Annular member 1 is internally provided with a pair of ball bearings 5a, 5b, which support the first movable sleeve 2 and ensure the rotation of the latter about longitudinal axis X,X'. The second movable sleeve 3 is carried by a pair of ball bearings 6a, 6b, ball bearing 6b being carried by the first movable sleeve ensuring the free rotation of said second sleeve about the longitudinal axis X,X'. At each of the ends of the annular nozzle holder member 1 are placed a first annular element 7 and a second annular element 8, whose internal diameter is substantially equal to the internal diameter of the second movable sleeve 3, in order to receive the fixed sleeve 4. Each of the ends of the fixed sleeve is coupled respectively to a gas generator, said gas generators then operating in parallel to supply a gas flow, whose continuous flow rate is substantially constant throughout the propellant combustion period. The auxiliary annular elements are physically joined to the annular nozzle holder member by a set of bolts such as 9 and 10 and the fixed sleeve 4 is provided with an annular protuberance 11 making it possible to longitudinally position openings $C_1$ to $C_4$, the means permitting the angular positioning of these openings being supplied by a key 11a.

The annular nozzle holder member comprises two recesses or counterbores 12, 13 for housing first and second double-acting rotary actuators 14, 15 making it possible to angularly position respectively the first and second movable sleeves. The two rotary actuators 14, 15 are angularly wedged or keyed by keys 16 engaged in the annular nozzle holder member. According to a possible embodiment, these two jacks are of the pneumatic type with two stable positions independently controlled by solenoid valves, which will be described hereinafter. The outlet spindles 17 of these rotary actuators are provided with toothed segments 18 engaging in toothed rings 19 integral with the movable sleeves. Finally auxiliary annular segments 7 and 8 are equipped with members 20a, 20b for connecting to the gas generators.

FIG. 3b is a longitudinal view showing the constructional details of the two solenoid valves for controlling the rotary jacks 14, 15 shown in FIG. 3a. These solenoid valves comprise a distribution slide valve 21 positioned within the annular nozzle holder member and which is operated by two electromagnets 22, 23, each of which more particularly incorporates an electric coil 24 and a sliding magnetic core 25, physically integral with the corresponding slide valve 21. These electromagnets are placed within recesses 26 located within the nozzle holder members and the auxiliary elements.

FIG. 3c is a cross-sectional view B—B illustrating constructional details of the pneumatic components of the angular positioning means of the movable sleeves. A rotary jack, such as 14, incorporates a cylindrical box 14a traversed by the outlet spindle 17 on which are fitted in line two orthogonal vanes such as 14b separated by a not shown partition, in order to produce cavities in which are arranged gas supply members 14c, said members jointly producing the two cavities 14d. This pneumatic jack is connected by two pipes to the distribution slide valve 21, only one of these pipes 27 being shown in the drawing.

FIG. 3d is a cross-section A—A of the relative positioning of the movable sleeves when nozzle $T_1$ is traversed by the gas flow. The components of the control device which are in direct contact with the gas flow must be made from a low erosion refractory material, such as graphite or molybdenum, the other components can be made from a light alloy.

FIGS. 4a to 4c show an embodiment of a control device incorporating a single movable sleeve, which rotates and translates in the manner described hereinbefore. The translation and rotation movements of this single movable sleeve being obtained by applying pressure forces to bosses located on the outer face of the sleeve.

FIG. 5a shows an embodiment of a first boss permitting the longitudinal translation of the movable sleeve 2. This boss can be constituted by an annular protuberance M whose two lateral faces are respectively exposed to unequal pressure forces F1 and F2.

FIG. 5b shows an embodiment of a second boss permitting the rotation of the sleeve. This boss can be constituted by a rectilinear protuberance N, whose two lateral faces are respectively exposed to unequal pressure forces F3 and F4.

The unequal pressure forces can be obtained by producing a gas leak on the side corresponding to the desired movement. According to a variant one of the bosses can be integral with the movable sleeve, whilst the other boss can be an independent member fitted into the preceding boss in the manner to be described hereinafter.

Reference will now be made to FIG. 4a which, in a partial view in longitudinal section, shows a control device including a single sleeve. This control device comprises an annular nozzle holder member 1 of longitudinal axis X,X' comprising a set of four nozzles associated in pairs, such as the diametrically opposite pair of nozzles $T_1$ and $T_3$. The inlets of nozzles $T_1$ to $T_4$ are located in the same plane and the orientation of these nozzles is inclined by an angle $\beta$ to the longitudinal axis X,X', the direction of the thrust forces supplied by these nozzles passing through the same point P. The control device also comprises a movable sleeve 2, including four gas passage ports, such as port C associated with the inlet of nozzle $T_3$. The movable sleeve is free to slide parallel to axis X,X' and to rotate about said axis X,X'. The movable sleeve comprises two annular bosses 2a, 2b for supplying a longitudinal translation means for said sleeve. The annular nozzle holder member 1 is integral with a coupling member 8, which, in combination with the movable sleeve 2, produces two toroidal cavities 1b, 1c, within which is disposed a cylindrical member 30 free to rotate without translation on the movable sleeve, the cylindrical member is fitted into bosses 2a, 2b and supplies the means permitting the rotation of the movable sleeve, as will be described hereinafter.

FIG. 4b is a simplified view in frontal section B—B of the constructional details of the pneumatic means making it possible to angularly and longitudinally position movable sleeve 2. The annular nozzle holder member 1 comprises two rectilinear bosses 1a which, in combination with the movable sleeve 2, define a first cavity 1b and a second cavity 1c. The movable sleeve comprises two diametrically opposite bosses 2a, 2b, located respectively in the first and second cavities. The cylindrical member 30 comprises four branches 30a, fitted into the bosses 2a, 2b of the movable sleeve 2. The cylindrical member can rotate without sliding within the two cavities 1b, 1c. The different parts of cavities 1c and 1d can be connected to control solenoid valves by gas conduits. Conduits L1 and L4 can control the rotary movement of cylindrical member 30 and conduits L5 to L8 can control the translation movements of bosses 2a and 2b and consequently the translation movement of the movable sleeve. In FIG. 4b conduits L5 and L7 are longitudinally displaced relative to conduits L6 and L8. Conduits L1 to L8 are connected to the corresponding outlets of the not shown solenoid valves.

FIG. 4c shows, in a view in frontal section A—A', the relative position of openings A and C and the corresponding nozzles $T_1$ and $T_3$, when the gas flow is diverted into nozzle $T_3$. For information purposes, the dotted lines show four recesses 31 for housing solenoid valves for controlling the movements of the movable sleeves, said valves operating in parallel and in pairs.

The advantages provided by a control device according to the invention are now more readily apparent and are in particular that as the sleeve is open at its two ends, the coupling thereof to two gas generators' arranged in symmetrical manner with respect to the thrust force application point P is facilitated. In addition, as the sleeves are bodies of revolution they can be machined with limited tolerances and ball bearings can be replaced with smooth bearings.

The invention is not limited to the embodiments described hereinbefore and the number and distribution of the sleeve openings can be modified in accordance with the arrangement of the nozzles, the rotary pneumatic actuators can be replaced by linear actuators or even by electric or hydraulic actuators.

A detailed description has been given of an embodiment of a control device comprising two movable sleeves positioned in rotation about the longitudinal axis X,X' of the device. It is also possible to directly deduce therefrom a control device in which the two sleeves are positioned parallel to axis X,X'.

The control device according to the invention is intended for use in rockets and missiles of the guided type operating in the atmosphere or outside the latter.

I claim:

1. A gas control device for steering guided missiles, comprising:
    an annular nozzle holder member having four equally spaced nozzles;
    first and second sleeve means coaxially arranged inside said annular member with each of said first and second sleeves having four spaced gas passages which are not equally spaced; and
    positioning means having two stable states in order to divert a gas flow towards one of said four nozzles.

2. A device according to claim 1, wherein the first and second sleeves are movable in rotation relative to the annular nozzle holder member.

3. A device according to claim 1, wherein one of the two sleeves is movable in rotation and the other is movable in translation relative to the annular nozzle holder member.

4. A device according to claim 1, wherein the two sleeves are movable in translation relative to the annular nozzle holder member.

5. A device according to claim 1, wherein each of the ends of the second movable sleeve is coupled to a gas generator.

6. A device according to claim 2, wherein the positioning means of the first and second sleeves comprise a rotary pneumatic actuator with two stable positions mounted in a recess located in the annular nozzle holder member and mechanically coupled to an outer part of the sleeves.

7. A device according to claim 1, wherein it comprises a third sleeve comprising a set of gas passage openings or ports, said third sleeve being adjacent to the second sleeve and rigidly fixed to the annular nozzle holder member.

8. A device according to claim 7, wherein each of the ends of this third sleeve is coupled to a gas generator.

* * * * *